US009971953B2

(12) United States Patent
Li et al.

(10) Patent No.: US 9,971,953 B2
(45) Date of Patent: May 15, 2018

(54) VISUAL RECOGNITION USING DEEP LEARNING ATTRIBUTES

(71) Applicant: Intel Corporation, Santa Clara, CA (US)

(72) Inventors: Jianguo Li, Beijing (CN); Yurong Chen, Beijing (CN); Jianwei Luo, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/300,474

(22) PCT Filed: Dec. 10, 2015

(86) PCT No.: PCT/CN2015/096882
§ 371 (c)(1),
(2) Date: Sep. 29, 2016

(87) PCT Pub. No.: WO2017/096570
PCT Pub. Date: Jun. 15, 2017

(65) Prior Publication Data
US 2018/0018535 A1    Jan. 18, 2018

(51) Int. Cl.
G06K 9/62 (2006.01)
G06K 9/46 (2006.01)
(Continued)

(52) U.S. Cl.
CPC ......... *G06K 9/4628* (2013.01); *G06K 9/6269* (2013.01); *G06K 9/66* (2013.01); *G06N 3/04* (2013.01); *G06N 3/08* (2013.01)

(58) Field of Classification Search
CPC .. G06K 9/629; G06K 9/6293; G06K 9/00288; G06K 9/66
See application file for complete search history.

(56) References Cited

U.S. PATENT DOCUMENTS 6,128,606 A * 10/2000 Bengio ............... G06F 17/509
706/10
6,539,113 B1 * 3/2003 Van Kleeck ......... G06K 9/6255
382/185

(Continued)

FOREIGN PATENT DOCUMENTS

CN   103824054 A   5/2014
CN   104217225 A   12/2014
EP   2833295 A2   2/2015

OTHER PUBLICATIONS

Hariharan et al., "Simultaneous Detection and Segmentation Computer Vision", ECCV 2014, Dec. 31, 2014, 16 pages.
(Continued)

Primary Examiner — Yosef Kassa
(74) Attorney, Agent, or Firm — Womble Bond Dickinson (US) LLP

(57) ABSTRACT

A processing device for performing visual recognition using deep learning attributes and method for performing the same are described. In one embodiment, a processing device comprises: an interface to receive an input image; and a recognition unit coupled to the interface and operable to perform visual object recognition on the input image, where the recognition unit has an extractor to extract region proposals from the input image, a convolutional neural network (CNN) to compute features for each extracted region proposal, the CNN being operable to create a soft-max layer output, a cross region pooling unit operable to perform pooling of the soft-max layer output to create a set of attributes of the input image, and an image classifier operable to perform image classification based on the attributes of the input image.

20 Claims, 5 Drawing Sheets

(51) Int. Cl.
  *G06N 3/08*  (2006.01)
  *G06N 3/04*  (2006.01)
  *G06K 9/66*  (2006.01)

(56) References Cited

U.S. PATENT DOCUMENTS

| | | | | |
|---|---|---|---|---|
| 6,819,790 | B2* | 11/2004 | Suzuki | G06T 7/0012 |
| | | | | 382/130 |
| 7,164,794 | B2* | 1/2007 | Shi | G06K 9/00986 |
| | | | | 382/156 |
| 7,724,957 | B2* | 5/2010 | Abdulkader | G06K 9/00852 |
| | | | | 382/185 |
| 8,340,452 | B2* | 12/2012 | Marchesotti | G03B 27/735 |
| | | | | 382/254 |
| 8,620,058 | B2* | 12/2013 | Nepomniachtchi | G06K 9/36 |
| | | | | 382/137 |

OTHER PUBLICATIONS

Yang et al., "Towards Real-Time Traffic Sign Detection and Classification", 2014 IEEE 17th International Conference on Intelligent Transportation Systems, Oct. 8-11, 2014, Qingdao, China, pp. 87-92.
PCT International Search Report for PCT/CN2015/096882, dated Jun. 28, 2016, 7 pages.
Written Opinion of the International Searching Authority for PCT/CN2015/096882, dated Jun. 28, 2016, 4 pages.

* cited by examiner

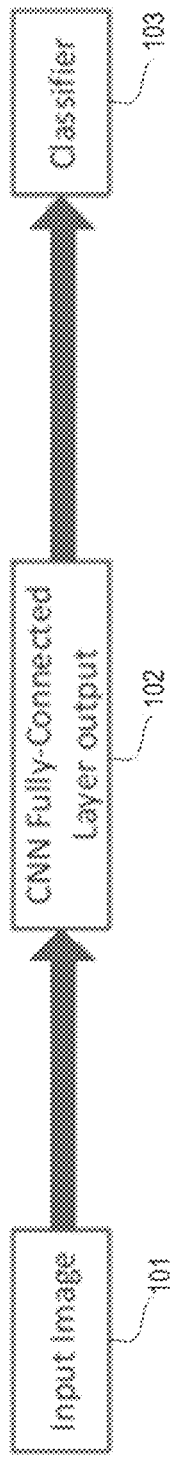
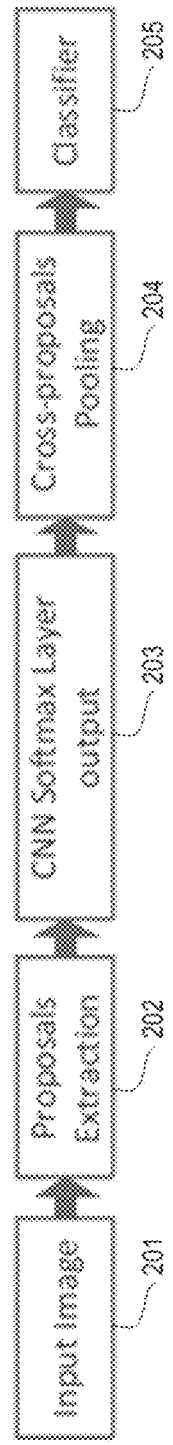
FIG. 1
FIG. 2

VISUAL RECOGNITION USING DEEP LEARNING ATTRIBUTES

RELATED APPLICATION

This patent application is a U.S. National Phase Application under 35 U.S.C. § 371 of International Application No. PCT/CN2015/096882, filed Dec. 10, 2015, entitled VISUAL RECOGNITION USING DEEP LEARNING ATTRIBUTES.

FIELD OF THE INVENTION

Embodiments of the present invention relate to visual recognition; more particularly, embodiments of the present invention relate to performing visual recognition using region proposals and the output from the soft-max layer of a convolutional neural network (CNN) models.

BACKGROUND OF THE INVENTION

Since the work by Krizhevsky and others on ImageNet large scale visual recognition challenge (ILSVRC) in 2012, additional research on convolutional neural networks (CNN) have been occurring. For example, research has been looking into transferring pre-trained CNN models on a large-scale dataset like ImageNet to other visual recognition tasks with limited new training data. The research appears focused on taking middle-layer activations of the pre-trained CNN models as rich feature representations to apply to various applications such as object detection, object recognition, image retrieval, etc. To achieve advanced and robust performance, people either fine-tune the pre-trained CNN models on their own tasks or make extensively data augmentation to get robust classifiers. These developed techniques have shown promising results in comparison to conventional methods using standard feature representations such as bag-of-words, sparse-coding, etc. However, the neural codes from the middle-layer have less semantic meaning, which could lead to the well-known semantic gap. In addition, such approaches may encounter the curse of dimensionality problem when employing pyramid or grid extension to middle-layer neural codes.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a traditional off-the-shelf CNN method of classification.

FIG. 2 is a flow diagram of one embodiment of a classification process.

DETAILED DESCRIPTION

Figure 3:
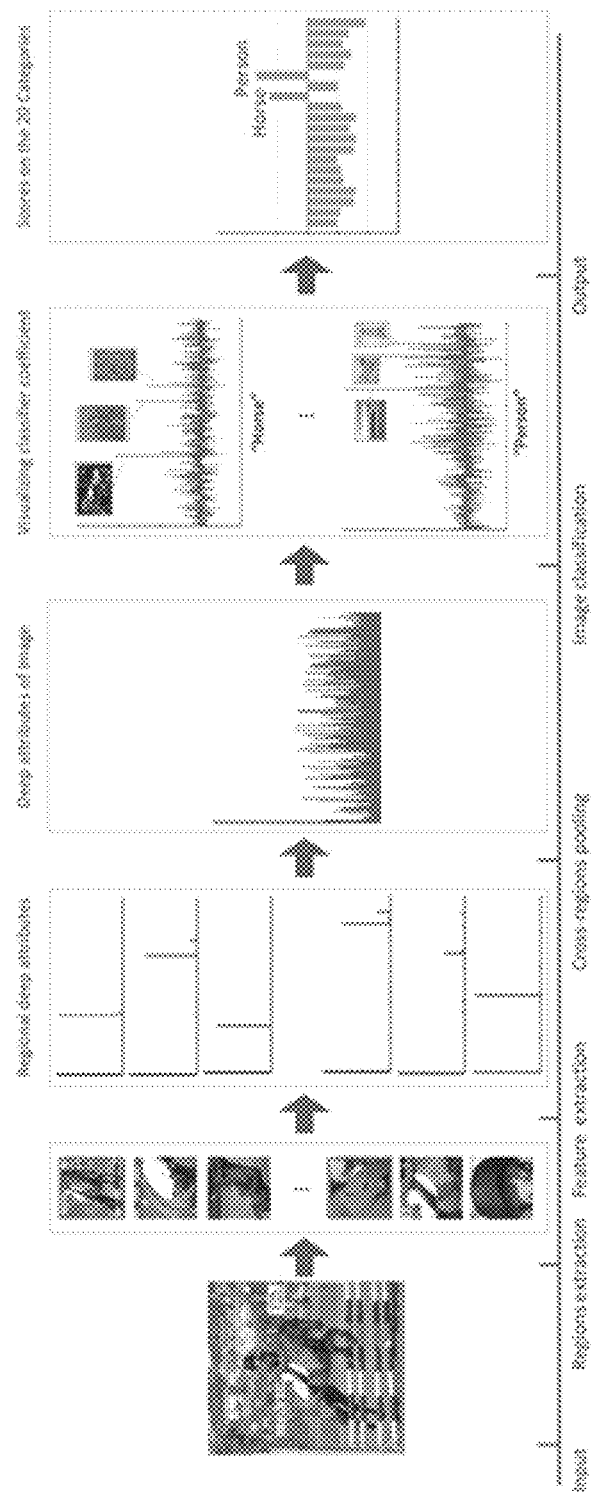
FIG. 3 illustrates one embodiment of a deep attribute framework.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the present invention perform visual recognition by integrating semantic output with as well as region proposals to achieve compact yet effective visual representations. In one embodiment the semantic output comprises the output from the soft-max layer of a pre-trained CNN models. In one embodiment, the visual representations comprise "deep attribute" (DA) data. Thus, the techniques described herein combine region proposal with soft-max layer output of pre-trained CNN models as features for visual recognition tasks.

FIG. 1 illustrates a traditional off-the-shelf CNN method of classification. Referring to FIG. 1, an input image 101 is input into a CNN 102. In response, CNN 102 produces a middle layer output. Linear classifier 103 receives the CNN middle layer output and uses it to perform classification.

FIG. 2 is a flow diagram of one embodiment of a classification process. Referring to FIG. 2, an input image 201 undergoes region extraction 202 to generate multiple regions of input image 201. These regions are referred to herein as region proposals. In one embodiment, extracting region proposals is accomplished by using selective search, which is well-known in the art. For more information, see J. Uijlings, et al., Selective Search for Object Recognition, IJCV, 2013. In another embodiment, extracting region proposals is accomplished by using edge-box, which is well-known in the art. For more information, see C. Zitnick and P. Dollar, Edge boxes: Locating Object Proposals From Edges, in ECCV, 2014.

Each of the regions is feed into a pre-trained CNN model 203 to perform feature extraction. In response, CNN model 203 generate soft-max layer output. The soft-max layer output for each of the regions indicates the region features. In one embodiment, CNN model 203 computes a response of each region to a number of predefined categories (e.g., 1000 categories) to generate a similarity score. Thus, an output is produced for each region that has similarity scores for each of the pre-defined categories. In one embodiment, the soft-max layer output comprises computed neural codes, which are the probability response to the categories on which CNNs are trained (e.g., high level semantic from ImageNet).

Next, pooling 204 is applied to the soft-max layer output from CNN model 203 to produce a representation of input image 201. In one embodiment, pooling 204 comprises cross-proposal max-pooling that is applied to regional neural codes to obtain a holistic representation of the image. More specifically, pooling 204 aggregates the similarity scores for all the attributes by taking the maximum score for each attribute across all regions to create a set of data containing the high score for each of the attributes across the entire input image (or portion thereof undergoing image classification). In one embodiment, this represents the deep attribute data. Note that cross-proposal max-pooling will suppress most noise regions, while keep most meaningful regions. The results of the cross-pooling operation are fed to classifier 205.

Classifier 205 performs a classification operation to the results of pooling 204. In one embodiment, classifier 205 comprises a linear classifier that performs image classification. In one embodiment, classifier 205 compares a score for each attribute against a threshold for a category of object (e.g., person, horse, etc.) and if the score is higher than the threshold for that category of object, classifier 205 determines the input image has that type of object. In one embodiment, classifier 205 appends or adds the results of the image classification as metadata to input image 201. For example, if classifier 205 determines the image has a person and a horse, then information is added to the metadata of the image to indicate that determination. Note that the information can be added to packets (e.g., a packet header, a packet field, etc.) that is being used to transport the image.

FIG. 3 illustrates one embodiment of the deep attribute framework associated with FIG. 2. Referring to FIG. 3, in one embodiment, the classifier is a linear SVM classifier y=wx, where x is the input feature vector, w is the SVM coefficient or weight learned for a specific category c, and wx is a dot-product between w and x, with w and x having the same dimensionality. The dot-product of wx yields a score y. The last column of FIG. 3 shows the score on 20 categories. If the score is larger than zero, that means the corresponding category appears or is activated on the image.

The disclosed process was evaluated on the PASCAL VOC 2007 and 2012 benchmarks for object recognition, which contains images of 20 categories including animals, handmade objects and natural objects. The objects are at different locations and scales with clutter background. Furthermore, there are usually multiple objects in one image which makes the problem difficult. Even if objects are annotated with bounding box, one embodiment of the object recognition process disclosed herein does not use this information in our experiments.

Table 1 below lists the results on both PASCAL VOC 2007 and 2012, in comparison to some state-of-the-art methods, along with their CNN settings. As shown, the techniques disclosed herein is fairly simple, without fine-tuning and data augmentation. The disclosed methods outperform the current state-of-the-art method very-deep (89.3%) with a notable margin (90.3%), without using sophisticated multi-scale, multi-crop data augmentation and fusion strategy as that in very-deep experiment, which is well-known in the art. For more information on the very-deep experiment, see Simonyan et al., Very Deep Convolutional Networks for Large-Scale Image Recognition, ICLR 2015.

TABLE 2

Results of Comparison on 102 categories for Flower Recognition

| Method | mean Accuracy |
|---|---|
| Dense HOG+Coding+Pooling w/o seg [1] | 76.7 |
| Seg+Dense HOG+Coding+Pooling [1] | 80.7 |
| CNN-SVM w/o seg [26] | 74.7 |
| CNNaug-SVM w/o seg [26] | 86.8 |
| DA w/o seg | 86.1 |
| MSDA w/o seg | 89.4 |
| ICRP-DA w/o seg | 90.1 |

In one embodiment, the classification process includes a multi-scale extension (MSDA) and context region refinement extension (CRP-DA). In MSDA, cross-region pooling is done on different scale interval according to region size proportion to the image size. For instance, in one embodiment, if two scale intervals are, [0, ½), (½, 1), when the region size is within ½ of the image size, the pooling is performed on the first scale intervals, while the region size is larger than ½, the pooling is performed separately on the $2^{nd}$ scale intervals. In one embodiment, the feature for each of the scales is concatenated to a long feature vector to train SVM classifier.

Note that for a specific category classifier, only a few regions are context regions. For instance, for a car classifier, the car region and wheel regions are context regions, while the region with animals like horse are background clutter. In one embodiment, a strategy referred to herein as context region refinement is used to select a category-specific context region.

In this case, global pooling attributes are used first to build a classifier. Then this classifier is used to classify each region to see whether the region is positive or negative relevant to the classifier. Based on the results, only those positive relevant regions are kept, and the pooling is performed again on these regions to train a new refined classifier. In one embodiment, this procedure is run for several iterations.

Note that the techniques described herein may be used to build consumer applications, such as, for example, image search/product search on mobile devices. This is very useful to a bricks-to-consumer (B2C) shopping provider.

TABLE 1

Results of Comparison on PASCAL VOC 2007 and 2012, with detailed CNN settings

| Method | CNN architecture | Fine-tuned | Augmentation | Features | 2007 mAP (%) | 2012 mAP (%) |
|---|---|---|---|---|---|---|
| CNN-SVM [26] | OverFeat [28] | No | No | FC | 73.9 | NA |
| CNNaug-SVM [26] | OverFeat [28] | No | Yes | FC | 77.2 | NA |
| IFT* [32] | Alexs [21] | Yes | No | FC | 74.4 | 74.7 |
| HCP-1000C* [32] | Alex's [21] | Yes | No | FC | 81.5 | 84.2 |
| HCP-2000C* [32] | Alex's [21] | Yes | Yes | FC | 85.2 | NA |
| CNN S FUN-RNK* [6] | CNN-S [o] | Yes | Yes | FC | 82.4 | 83.2 |
| Very-Deep [29] | VGG-16 [29] | No | Yes | FC | 89.3 | 89.0 |
| DA | VGG-16 [29] | No | No | Soft-max | 85.6 | 86.0 |
| MSDA | VGG-16 [29] | No | No | Soft-max | 89.1 | 89.1 |
| ICRP-DA | VGG-16 [29] | No | No | Soft-max | 90.3 | 90.0 |

The techniques were further evaluated on fine-grained flower recognition task using the Oxford follower dataset, which contains 102 categories of flowers, with each category containing 40 to 258 of images. The flowers appear at different scales, pose and lighting conditions. The evaluation follows the standard protocol of this benchmark and report mean Accuracy on the Oxford 102 flowers dataset in Table 2 below. It shows the proposed approach outperforms existing methods with a large margin about 4%.

Figure 4:
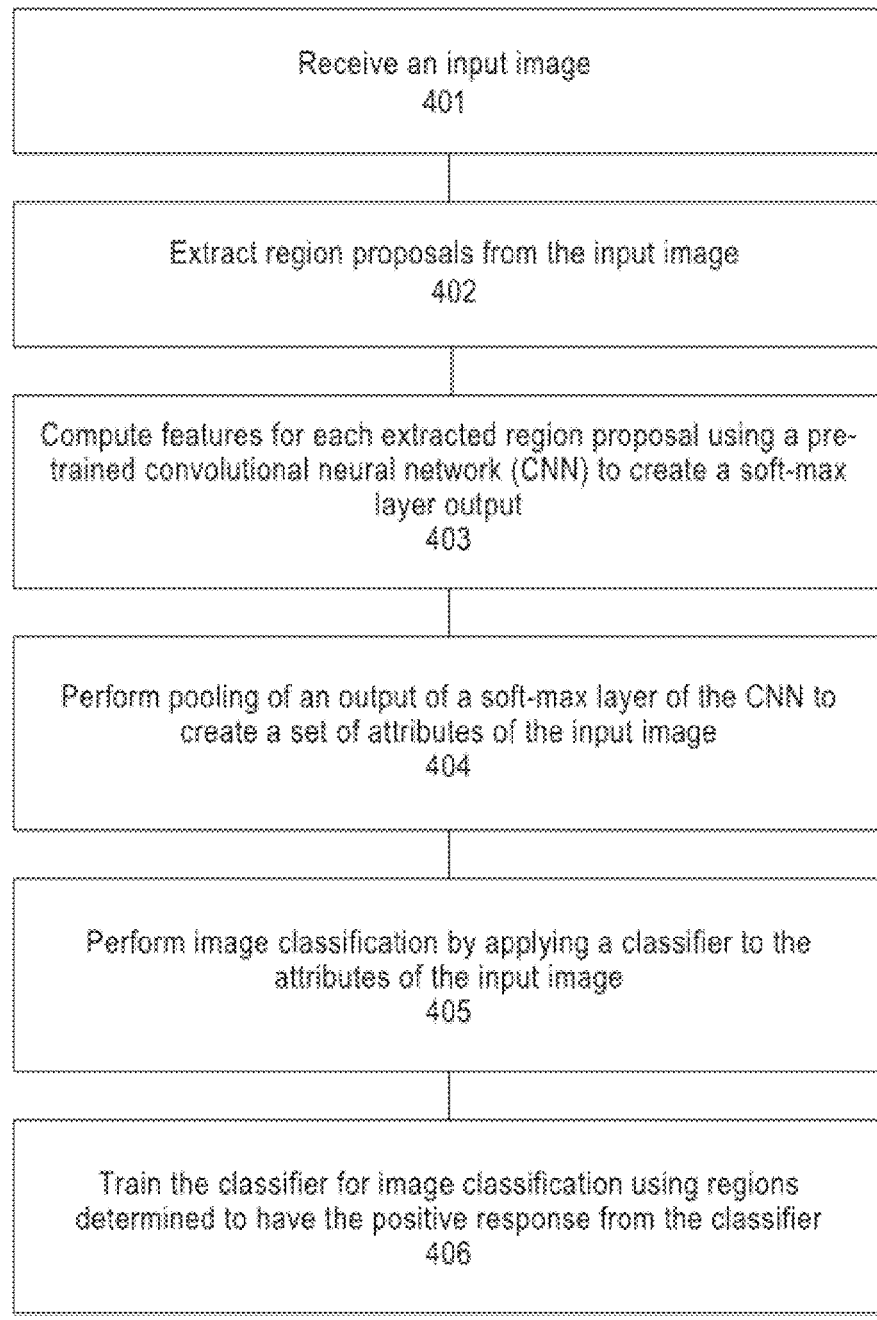
FIG. 4 is a flow diagram of one embodiment of a process for performing visual object recognition on an input image.

FIG. 4 is a flow diagram of one embodiment of a process for performing visual object recognition on an input image. The process is performed by processing logic that may comprise hardware (circuitry, dedicated logic, etc.), software (such as is run on a general purpose computer system or a dedicated machine), firmware, or a combination of the three.

Referring to FIG. 4, the process begins by receiving an input image (processing block 401). In response to the input image, processing logic extracts region proposals from the input image (processing block 402). That, processing logic divides the input image into multiple regions. In one embodiment, extracting region proposals from the input image comprises generating possible object locations using a selective search with segmentation. In another embodiment, extracting region proposals from the input image comprises locating objects based on edges.

For each of the regions, processing logic computes features for each extracted region proposal using a pre-trained convolutional neural network (CNN) to create a soft-max layer output (processing block 403). In one embodiment, the soft-max layer output comprises regional neural codes.

Processing logic performs pooling of an output of a soft-max layer of the CNN to create a set of attributes of the input image (processing block 404). In one embodiment, performing pooling of the output of the soft-max layer of the CNN comprises performing a cross-region max-pooling of regional neural codes from the output of the soft-max layer of the CNN. In one embodiment, performing cross-region max-pooling is done on different scale intervals according to region size.

After creating the set of attributes, processing logic performs image classification by applying a classifier to the attributes of the input image (processing block 405). In one embodiment, processing logic performs image classification by applying a classifier to the attributes of the input image comprises generating a score for each of a plurality of categories based on a comparison to the attributes to classifier coefficients.

In one embodiment, processing logic optionally trains the classifier for image classification using regions determined to have the positive response from the classifier (processing block 406). That is, in one embodiment, processing logic classifies each region using a classifier to determine whether each region has a positive response from the classifier. In one embodiment, the classifier is built using attributes obtained from cross-region pooling.

Figure 5:
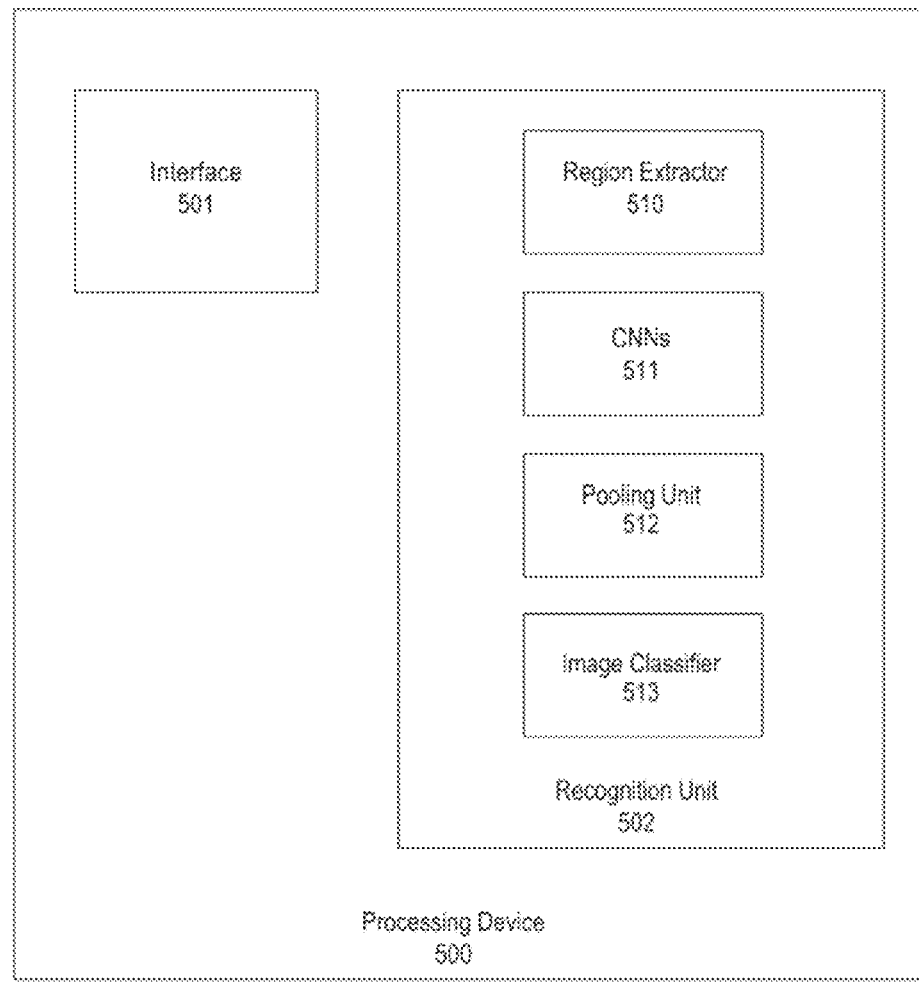
FIG. 5 is a block diagram of one embodiment of a processing device.

FIG. 5 is a block diagram of one embodiment of a processing device that performs the operations describe above. In one embodiment, the processing device comprises a processor, system-on-a-chip (SoC), a controller, etc.

Referring to FIG. 5, processing device 500 includes an interface 501 to receive an input image and a recognition unit 502 coupled to interface 501 to perform visual object recognition on the input image.

In one embodiment, recognition unit 502 includes a region extractor 510 to extract region proposals from the input image. In one embodiment, region extractor 510 extracts region proposals from the input image by generating possible object locations using a selective search with segmentation. In another embodiment, region extractor 510 extracts region proposals from the input image by locating objects based on edges.

In one embodiment, recognition unit 502 includes convolutional neural networks (CNNs) 511, with associated processing logic, to compute features for each extracted region proposal and create a soft-max layer output. In one embodiment, wherein the soft-max layer output comprises regional neural codes.

In one embodiment, recognition unit 502 includes a cross region pooling unit 512 that performs pooling of the soft-max layer output to create a set of attributes of the input image. In one embodiment, the cross region pooling unit performs pooling of the output of the soft-max layer of the CNNs by performing a cross-region max-pooling of regional neural codes from the output of the soft-max layer of the CNNs. In one embodiment, the cross region pooling unit performs cross-region max-pooling on different scale intervals according to region size.

In one embodiment, recognition unit 502 includes an image classifier 513 that performs image classification based on the attributes of the input image created by cross-region polling unit 512. In one embodiment, image classifier 513 classifies each region to determine whether that region has a positive response from image classifier. In one embodiment, the image classifier performs image classification by generating a score for each of a plurality of categories based on a comparison to the attributes to classifier coefficients.

In one embodiment, image classifier 512 is built using attributes obtained from the cross-region pooling unit. In one embodiment, the image classifier is trained based on results of determining whether each region has the positive response from the image classifier.

In one embodiment, recognition unit 502 comprises hardware (circuitry, dedicated logic, etc.), software (such as is run on a general purpose computer system or a dedicated machine), firmware, or a combination of the three.

Figure 6:
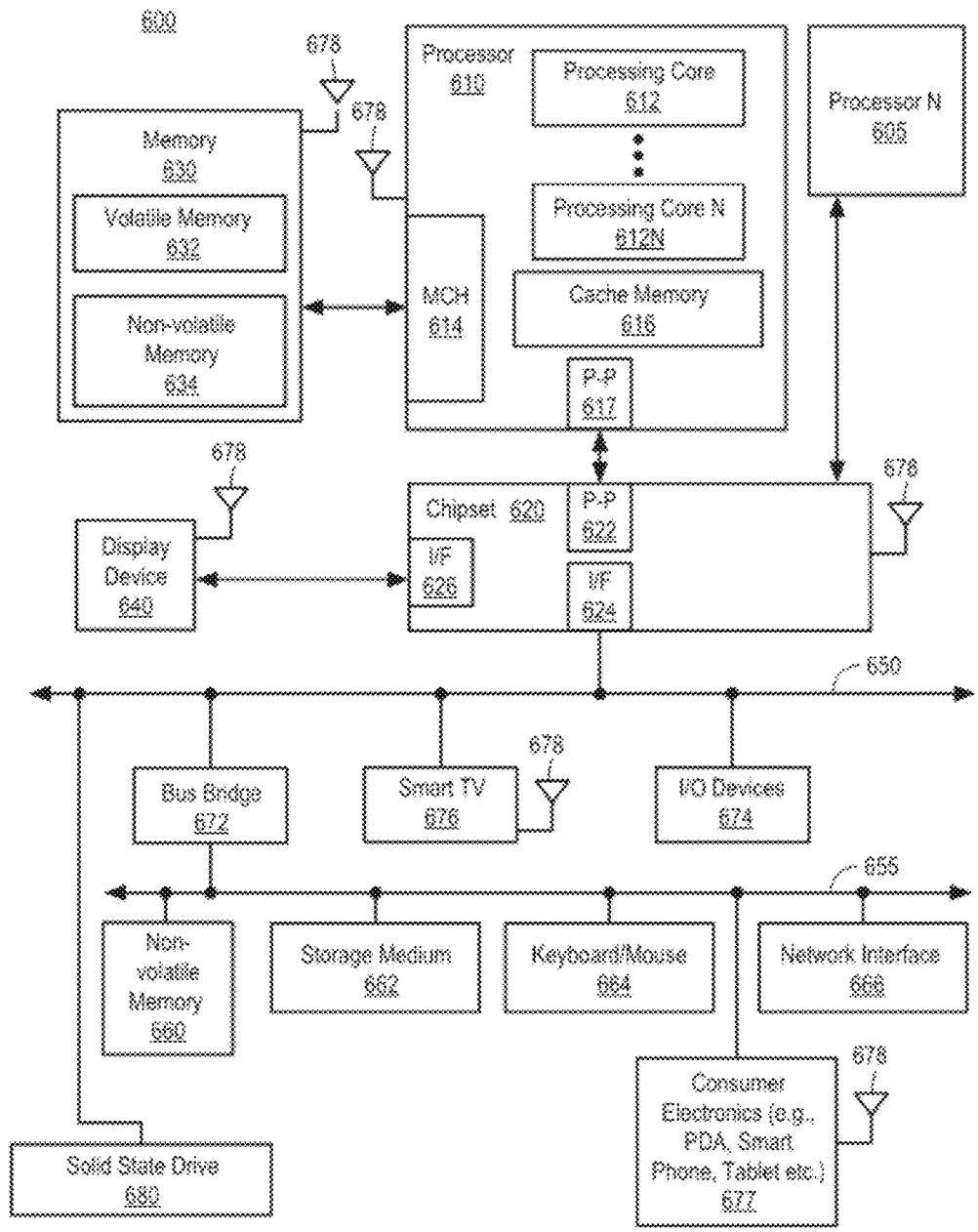
FIG. 6 illustrates one embodiment of a system.

FIG. 6 is one embodiment of a system level diagram 600 that may incorporate the techniques described above, such as the image classification flow of FIG. 2A, 2B or 4. For example, the techniques described above may be incorporated into a processor core of a processor in system 600.

Referring to FIG. 6, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 600 implements the methods disclosed herein and may be a system on a chip (SOC) system.

In one embodiment, processor 610 has one or more processor cores 612 to 612N, where 612N represents the Nth processor core inside the processor 610 where N is a positive integer. In one embodiment, system 600 includes multiple processors including processors 610 and 605, where processor 605 has logic similar or identical to logic of processor 610. In one embodiment, system 600 includes multiple processors including processors 610 and 605 such that processor 605 has logic that is completely independent from the logic of processor 610. In such an embodiment, a multi-package system 600 is a heterogeneous multi-package system because the processors 605 and 610 have different logic units. In one embodiment, processing core 612 includes, but is not limited to, pre-fetch logic to fetch instructions, decode logic to decode the instructions, execution logic to execute instructions and the like. In one embodiment, processor 610 has a cache memory 616 to cache instructions and/or data of the system 600. In another embodiment of the invention, cache memory 616 includes level one, level two and level three, cache memory, or any other configuration of the cache memory within processor 610.

In one embodiment, processor 610 includes a memory control hub (MCH) 614, which is operable to perform functions that enable processor 610 to access and communicate with a memory 630 that includes a volatile memory 632 and/or a non-volatile memory 634. In one embodiment, memory control hub (MCH) 614 is positioned outside of processor 610 as an independent integrated circuit.

In one embodiment, processor 610 is operable to communicate with memory 630 and a chipset 620. In such an embodiment, SSD 680 executes the computer-executable instructions when SSD 680 is powered up.

In one embodiment, processor 610 is also coupled to a wireless antenna 678 to communicate with any device configured to transmit and/or receive wireless signals. In one embodiment, wireless antenna interface 678 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory (e.g., NAND, NOR), phase change memory (PCM), read-only memory (ROM), electrically erasable programmable read-only memory (EEPROM), or any other type of non-volatile memory device.

Memory 630 stores information and instructions to be executed by processor 610. In one embodiment, chipset 620 connects with processor 610 via Point-to-Point (PtP or P-P) interfaces 617 and 622. In one embodiment, chipset 620 enables processor 610 to connect to other modules in the system 600. In one embodiment, interfaces 617 and 622 operate in accordance with a PtP communication protocol such as the Intel QuickPath Interconnect (QPI) or the like.

In one embodiment, chipset 620 is operable to communicate with processor 610, 605, display device 640, and other devices 672, 676, 674, 660, 662, 664, 666, 677, etc. In one embodiment, chipset 620 is also coupled to a wireless antenna 678 to communicate with any device configured to transmit and/or receive wireless signals.

In one embodiment, chipset 620 connects to a display device 640 via an interface 626. In one embodiment, display device 640 includes, but is not limited to, liquid crystal display (LCD), plasma, cathode ray tube (CRT) display, or any other form of visual display device. In addition, chipset 620 connects to one or more buses 650 and 655 that interconnect various modules 674, 660, 662, 664, and 666. In one embodiment, buses 650 and 655 may be interconnected together via a bus bridge 672 if there is a mismatch in bus speed or communication protocol. In one embodiment, chipset 620 couples with, but is not limited to, a non-volatile memory 660, a mass storage device(s) 662, a keyboard/mouse 664, and a network interface 666 via interface 624, smart TV 676, consumer electronics 677, etc.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 6 are depicted as separate blocks within the system 600, the functions performed by some of these blocks may be integrated within a single semiconductor circuit or may be implemented using two or more separate integrated circuits.

In a first example embodiment, a processing device comprises: an interface to receive an input image; and a recognition unit coupled to the interface and operable to perform visual object recognition on the input image, where the recognition unit has an extractor to extract region proposals from the input image, a convolutional neural network (CNN) to compute features for each extracted region proposal, the CNN being operable to create a soft-max layer output, a cross region pooling unit operable to perform pooling of the soft-max layer output to create a set of attributes of the input image, and an image classifier operable to perform image classification based on the attributes of the input image.

In another example embodiment, the subject matter of the first example embodiment can optionally include that the soft-max layer output comprises regional neural codes.

In another example embodiment, the subject matter of the first example embodiment can optionally include that the cross region pooling unit performs pooling of the output of the soft-max layer of the CNN by performing a cross-region max-pooling of regional neural codes from the output of the soft-max layer of the CNN. In another example embodiment, the subject matter of this example embodiment can optionally include that the cross region pooling unit performs cross-region max-pooling on different scale intervals according to region size.

In another example embodiment, the subject matter of the first example embodiment can optionally include that the region extractor extracts region proposals from the input image by generating possible object locations using a selective search with segmentation or by locating objects based on edges.

In another example embodiment, the subject matter of the first example embodiment can optionally include that the image classifier is operable to classify each region to determine whether said each region has a positive response from image classifier.

In another example embodiment, the subject matter of the first example embodiment can optionally include that the image classifier is built using attributes obtained from the cross-region pooling unit. In another example embodiment, the subject matter of this example embodiment can optionally include that the image classifier is trained based on results of determining whether each region has the positive response from the image classifier.

In another example embodiment, the subject matter of the first example embodiment can optionally include that the image classifier is operable to perform image classification by generating a score for each of a plurality of categories based on a comparison to the attributes to classifier coefficients.

In a second example embodiment, a method for performing visual object recognition on an input image comprises: extracting region proposals from the input image; computing features for each extracted region proposal using a pre-trained convolutional neural network (CNN) to create a soft-max layer output; performing pooling of an output of a soft-max layer of the CNN to create a set of attributes of the input image; and performing image classification by applying a classifier to the attributes of the input image.

In another example embodiment, the subject matter of the second example embodiment can optionally include that the soft-max layer output comprises regional neural codes.

In another example embodiment, the subject matter of the second example embodiment can optionally include that performing pooling of the output of the soft-max layer of the CNN comprises performing a cross-region max-pooling of regional neural codes from the output of the soft-max layer of the CNN. In another example embodiment, the subject matter of this example embodiment can optionally include that performing cross-region max-pooling is done on different scale intervals according to region size.

In another example embodiment, the subject matter of the second example embodiment can optionally include that the extracting region proposals from the input image comprises generating possible object locations using a selective search with segmentation or by locating objects based on edges.

In another example embodiment, the subject matter of the second example embodiment can optionally include classifying each region using a classifier to determine whether said each region has a positive response from the classifier. In another example embodiment, the subject matter of this example embodiment can optionally include that the classifier is built using attributes obtained from cross-region pooling. In another example embodiment, the subject matter of this example embodiment can optionally include training the classifier for image classification using regions determined to have the positive response from the classifier.

In another example embodiment, the subject matter of the second example embodiment can optionally include that performing image classification by applying a classifier to the attributes of the input image comprises generating a score for each of a plurality of categories based on a comparison to the attributes to classifier coefficients.

In a third example embodiment, an article of manufacture has one or more non-transitory computer readable media storing instructions which, when executed by a system, cause the system to perform a method comprising: extracting region proposals from the input image; computing features for each extracted region proposal using a pre-trained convolutional neural network (CNN) to create a soft-max layer output; performing pooling of an output of a soft-max layer of the CNN to create a set of attributes of the input image; and performing image classification by applying a classifier to the attributes of the input image.

In another example embodiment, the subject matter of the third example embodiment can optionally include that the soft-max layer output comprises regional neural codes.

In another example embodiment, the subject matter of the third example embodiment can optionally include that performing pooling of the output of the soft-max layer of the CNN comprises performing a cross-region max-pooling of regional neural codes from the output of the soft-max layer of the CNN.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A processing device, the processing device comprising:
an interface to receive an input image; and
a recognition unit coupled to the interface and operable to perform visual object recognition on the input image, the recognition unit having
an extractor to extract region proposals from the input image;
a convolutional neural network (CNN) to compute features for each extracted region proposal, the CNN being operable to create a soft-max layer output;
a cross region pooling unit operable to perform pooling of the soft-max layer output to create a set of attributes of the input image; and
an image classifier operable to perform image classification based on the attributes of the input image.

2. The processing device defined in claim 1 wherein the soft-max layer output comprises regional neural codes.

3. The processing device defined in claim 1 wherein the cross region pooling unit performs pooling of the output of the soft-max layer of the CNN by performing a cross-region max-pooling of regional neural codes from the output of the soft-max layer of the CNN.

4. The processing device defined in claim 3 wherein the cross region pooling unit performs cross-region max-pooling on different scale intervals according to region size.

5. The processing device defined in claim 1 wherein the region extractor extracts region proposals from the input image by generating possible object locations using a selective search with segmentation or by locating objects based on edges.

6. The processing device defined in claim 1 wherein the image classifier is operable to classify each region to determine whether said each region has a positive response from image classifier.

7. The processing device defined in claim 6 wherein the image classifier is built using attributes obtained from the cross-region pooling unit.

8. The processing device defined in claim 6 wherein the image classifier is trained based on results of determining whether each region has the positive response from the image classifier.

9. The processing device defined in claim 1 wherein the image classifier is operable to perform image classification by generating a score for each of a plurality of categories based on a comparison to the attributes to classifier coefficients.

10. A method for performing visual object recognition on an input image, the method comprising:
    extracting region proposals from the input image;
    computing features for each extracted region proposal using a pre-trained convolutional neural network (CNN) to create a soft-max layer output;
    performing pooling of an output of a soft-max layer of the CNN to create a set of attributes of the input image; and
    performing image classification by applying a classifier to the attributes of the input image.

11. The method defined in claim 10 wherein the soft-max layer output comprises regional neural codes.

12. The method defined in claim 10 wherein performing pooling of the output of the soft-max layer of the CNN comprises performing a cross-region max-pooling of regional neural codes from the output of the soft-max layer of the CNN.

13. The method defined in claim 12 wherein performing cross-region max-pooling is done on different scale intervals according to region size.

14. The method defined in claim 10 wherein the extracting region proposals from the input image comprises generating possible object locations using a selective search with segmentation or by locating objects based on edges.

15. The method defined in claim 10 further comprising classifying each region using a classifier to determine whether said each region has a positive response from the classifier.

16. The method defined in claim 15 wherein the classifier is built using attributes obtained from cross-region pooling.

17. The method defined in claim 10 wherein performing image classification by applying a classifier to the attributes of the input image comprises generating a score for each of a plurality of categories based on a comparison to the attributes to classifier coefficients.

18. An article of manufacture having one or more non-transitory computer readable media storing instructions which, when executed by a system, cause the system to perform a method comprising:
    extracting region proposals from the input image;
    computing features for each extracted region proposal using a pre-trained convolutional neural network (CNN) to create a soft-max layer output;
    performing pooling of an output of a soft-max layer of the CNN to create a set of attributes of the input image; and
    performing image classification by applying a classifier to the attributes of the input image.

19. The article of manufacture defined in claim 18 wherein the soft-max layer output comprises regional neural codes.

20. The article of manufacture defined in claim 18 wherein performing pooling of the output of the soft-max layer of the CNN comprises performing a cross-region max-pooling of regional neural codes from the output of the soft-max layer of the CNN.

* * * * *